United States Patent
Grabske

[15] 3,703,260
[45] Nov. 21, 1972

[54] MATERIAL SPREADER

[72] Inventor: John P. Grabske, 2120 East Norwich, St. Francis, Wis. 53207

[22] Filed: Dec. 4, 1970

[21] Appl. No.: 95,131

[52] U.S. Cl. ....................239/666, 239/687, 239/689
[51] Int. Cl. ................................................A01c 17/00
[58] Field of Search......239/687, 666, 665, 681, 687, 239/688, 689, 672, 676

[56] References Cited

UNITED STATES PATENTS

| | | | |
|---|---|---|---|
| 1,312,226 | 8/1919 | Bangert | 239/687 |
| 3,158,375 | 11/1964 | Vig | 239/665 X |
| 3,287,021 | 11/1966 | Herd | 239/665 X |
| 3,438,585 | 4/1969 | Buchmann | 239/665 |
| 2,500,682 | 3/1950 | Hoffstetter | 239/666 X |
| 3,540,661 | 11/1970 | Van Der Lely | 239/666 X |
| 2,190,619 | 2/1940 | Watson | 239/687 X |
| 2,705,149 | 3/1955 | Torrey | 239/665 |

Primary Examiner—M. Henson Wood, Jr.
Assistant Examiner—John J. Love
Attorney—Wheeler, House & Wheeler

[57] ABSTRACT

A compact versatile material spreader for use with salt or other materials has a spinner, which is partially enclosed by a spinner housing and which is located below a hopper discharge outlet and above the bottom of the spreader frame to thus afford convenient mounting of the spreader on the flat bed of a truck, a railroad push car, or a pallet carried by a fork-lift truck. An accessory trailer permits the spreader to be trailed behind a vehicle. Adjustable spinner blades afford various selected horizontal discharge angles. A remotely controlled deflector assembly is hinged to the spinner housing and includes independently adjustable side and rear deflector plates to provide safe control of the discharged material to avoid contact with other vehicles or pedestrians. A metering gate at the hopper discharge outlet provides a variable discharge rate and economy in operation.

5 Claims, 5 Drawing Figures

PATENTED NOV 21 1972
3,703,260
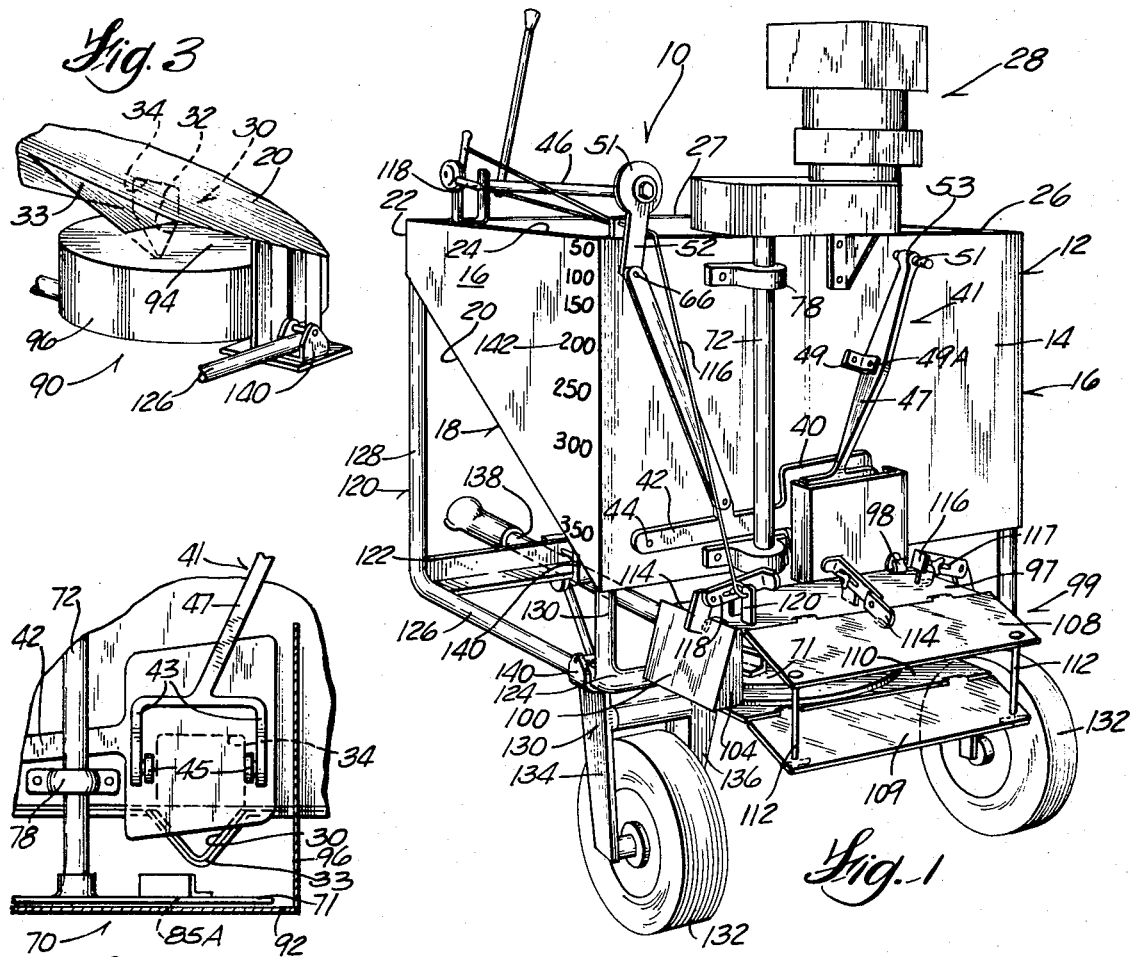
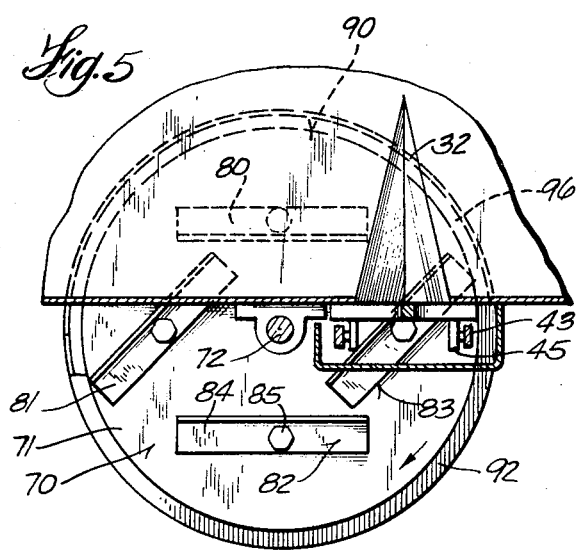
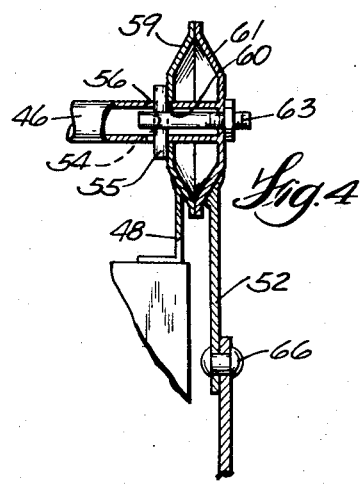
Inventor
John P. Grabske
By
Wheeler, House & Wheeler
Attorneys

MATERIAL SPREADER

BACKGROUND OF INVENTION

Heretofore, chemical and material spreaders, particularly those employed for de-icing operations with salt, utilize a generally unconfined spinner with fixed blades mounted in an over-hanging depending position below the bed of a truck. The spreading width of the material is varied by adjusting the speed of a hydraulic spinner motor which is driven either by a vehicle hydraulic system or a separate gasoline motor and pump. With these prior art spreaders, discharge to the rear of the vehicle cannot be decreased without also decreasing the width of the spread. If the spreading vehicle is closely followed by another vehicle or if the spreader is used on a sidewalk, the operator has to decrease the width of spread to avoid hitting vehicles or pedestrians behind the spreader and this may result in inadequate material spreading.

SUMMARY OF INVENTION

The invention provides a material spreader which has a spinner located above the bottom of the frame and partially enclosed by a spinner housing so that there is no forward material discharge, and thus, the spreader can be carried without overhang on the flat bed of a truck, a pallet, or a railroad pushcart, etc. The spreader has a frame which can be conveniently connected to an accessory trailer assembly.

Adjustable spinner blades permit the horizontal discharge angle to be varied. The vertical discharge angle, trajectory or throw-out distance is controlled by a deflector assembly which includes a hinged top plate which is pivotally mounted on the top wall of a spinner housing. A push-pull cable connected to a control lever located for easy access by the operator swings the deflector assembly from the lower deflecting position to a retracted non-deflecting position. The side and rear deflector plates are independently adjustably connected to the top plate so that the material discharge can be limited to either side, both sides, or just rearwardly of the spinner. When required, the deflector assembly can be lowered to confine the discharge from the spinner to avoid spraying following or passing vehicles or pedestrians. A bottom deflector plate can be inclined upwardly to increase the throw-out distance.

To provide precise metering control, and minimize waste of material, the hopper includes a remotely controlled gate which is pivotally mounted for swinging movement across the hopper discharge outlet. The gate can be adjusted to meter small quantities of material or large lumps or chunks to thus unclog the hopper outlet. A friction brake maintains the gate in the selected position.

Further objects and advantages of the invention will become apparent from the following disclosure.

DRAWINGS

FIG. 1 is a rear perspective view of a material spreader in accordance with the invention.

FIG. 2 is an enlarged fragmentary view of the hopper outlet and gate shown in FIG. 1.

FIG. 3 is a fragmentary perspective view of the hopper and the hopper spout.

FIG. 4 is a fragmentary view of the control linkage for the gate shown in FIG. 2.

FIG. 5 is a fragmentary top view of the spinner shown in FIGS. 1 and 2.

DESCRIPTION

Although the disclosure hereof is detailed and exact to enable those skilled in the art to practice the invention, the physical embodiments herein disclosed merely exemplify the invention which may be embodied in other specific structures.

FIG. 1 shows a material spreader 10 which includes a hopper 12 having a generally vertical rear hopper wall 14, spaced side walls 16 and a forward wall 18 having an inclined wall portion 20 and a vertical portion 22. The walls 14 and 18 are preferably formed from a single piece of material. The hopper 12 has inwardly extending upper flanges 24, 26 and 27. The flange 24 supports control levers subsequently described and the flange 26 supports an engine and drive train 28 which can include a clutch. The hopper outlet 30 is formed by a V-shaped cut out or slot 32 in the wall portion 20 and a square or rectangular cut out or aperture 34 in the rear wall 14. A V-shaped trough or spout 33 is connected to the inclined wall portion 20 and is located beneath the slot 32 and terminates flush with the wall 14. The trough 33 gives effective control for conveying small particles to the outlet 30.

To adjustably meter the flow of material from the outlet 30, the spreader is provided with a metering plate or gate 40. Means are provided for supporting the gate 40 for swinging movement in a vertical plane between a position closing the outlet 34, a range of partially open positions, and a fully open outlet position. As disclosed, the means comprises an arm 42 which is pivoted by a bolt 44 to the rear hopper wall 14.

Means are provided for biasing the gate 40 against the hopper wall 14 to oppose pressure on the gate from the material exposed in the hopper discharge opening 30. As disclosed, the means includes a fork 41 having spaced legs 43 each provided with a roller 45. The fork handle 47 is pivoted intermediate its length to the hopper wall 14 by brackets 49 and a cross pin 49A. A bolt 51 threaded in a boss 53 bears against wall 14 to pressure the rollers 45.

Means are provided for remotely controlling the metering position of the gate. In the disclosed construction, the means include a tubular rock shaft 46 which is supported in part by a bracket 48 which is welded to a friction cup 59 (FIG. 4) which has an aperture 60 which receives the end of shaft 46. The friction cup 59 engages an opposed cup 61 which is welded to an arm 52. The friction cups 59, 61 are clamped together by a bolt 63 which has an aperture 54 which receives a cross pin 55. The cross pin 55 projects through an oversize transverse aperture 56 in the rock shaft 46. The arm 52 is pivotally connected to gate arm 42 by a pin 66.

Material is conveyed by gravity through the hopper outlet 30 to the spinner 70 which includes a spinner plate 71 which is driven by a spinner shaft 72 connected to the engine and drive train 28. The spinner shaft 72 is supported on the hopper wall 14 by bearing blocks 78. To provide control of the horizontal angle of discharge of material metered through the opening 30 to the spinner 70, the spinner 70 includes one or more and preferably four spinner throwers or blades 80, 81, 82, 83. Means are provided for adjustably mounting the blades on the spinner plate 70. As disclosed, each blade has a flange 84 which is secured to the plate by a bolt 85 which extends through apertures 85A in the plate 70. The apertures 85A are equally spaced at 90°.

The spinner blades can be adjusted at any angle relative to the axis of the spinner plate 70 to control the spreading or discharge angle of the material. As shown in FIG. 4, the blades 80, 82 are adjusted so they are parallel to the hopper wall 14, and the blades 81, 83 intersect the plane of the hopper wall 14 at generally 45°. The spinner 70 rotates in a clockwise direction as viewed in FIG. 5 and the blades 80, 82 commence throw out at approximately three o'clock and continue to throw material until the blades 80 and 82 reaches six o'clock. Thus, the horizontal spread of material caused by the blades 80, 82 encompasses an angle of about 90°. The blades 81, 83 throw out material between six and nine o'clock, so the total horizontal spreading angle with all the spinner blades is about 180°.

For a material spread confined to a narrow path to the rear of the spreader, the blades can be adjusted at an angle of about 22° relative to the hopper wall 14 measured when the mounting bolt 85 for the blade is beneath the wall 14. Less than four blades can be employed for a sparse or thin distribution of material. Typical prior art spreaders employ radial blades and the material slides radially outwardly off the blades as the centrifugal force overcomes the inertia of the material. The material frequently accumulates around the axis of the spinner and dual counter-rotating spinners have been employed to overcome this difficulty. However, the discharge angle with prior art spreaders is unpredictable and can vary with the speed of the spinner. The spinner of the invention overcomes these difficulties.

To prevent discharge of the material beneath the spreader and thus permit the spreader to be completely supported on the flat bed of a truck or other vehicle without any overhang of the spinner as with prior art spreaders, the spinner is partially enclosed by a spinner housing 90. The spinner housing 90 includes a circular bottom wall 92 (FIG. 1), a semi-circular spaced top wall 94 and an arcuate side wall 96 (FIG. 3) which has an arcuate extent of generally 180°. The bottom wall 92 has a diameter larger than the spinner plate.

In addition to control of the horizontal spreading angle with the adjustable spinner blades, means are provided for remotely controlling the vertical discharge angle or the trajectory and the throw out distance of the material. As disclosed, the means includes a deflector assembly 99 which includes a deflector top plate 97 which is hinged to the spinner housing top wall 94 by a pair of hinges 98. The deflector assembly 99 also includes two deflector side plates 100. The side plates 100 are hinged to the top plate 97. The deflector assembly 99 also includes a rear plate 108 which is hinged to the top plate 97. To provide complete enclosure of the spinner when the rear plate and side plates are in their lowermost position, the side plates 100 have inturned flanges 104.

FIG. 1 shows an optional bottom deflector plate 109 which is hinged to an adaptor plate 110 bolted to the bottom spinner housing wall 92. The deflector 109 can be linked to the rear plate 108 by a link or rod 112 having a head at one end and a cross pin at the other end. The hinges or pivotal connections employed between the side, rear and bottom plates are in the form of slots in one hinged member and hooks in the other so that the plates can easily be detached when not in use. Furthermore, the loose hinges insure free pivotal movement without binding, even when corrosion occurs or material accumulates in the hinges.

Means are provided for adjusting the angle between the deflector top plate 97, the deflector side plates 100 and the rear plate 108 to vary the trajectory or throw out distance. As disclosed, the means includes upstanding tabs 114 on the side and top walls, upstanding tabs 116 on the top wall and links 118 having one link end pivotally connected to the tabs on the side walls and the rear wall. The links include slots 117 which receive bolts 115 which extend through apertures in the tabs 116 on the top wall to adjustably position the links, and thus, the angle of the side and rear deflector plates.

The bottom deflector plate 109 is advantageously employed at an upwardly extending angle when the spreader is carried close to the ground, as for instance, when mounted on the accessory trailer presently described. The upward trajectory of the material thus causes a greater spreading area. The rear plate 108 can be adjusted at a downward angle to direct the material immediately behind the spreading vehicle to prevent hitting closely following vehicles or pedestrians on a side walk. The side plates can be employed to confine spreading to a narrow strip, as for instance, a railroad track or for discharge soley to the right or left. Accordingly, a salt spread can be confined to a single lane of a multiple lane road.

Means are provided for remotely controlling the position of the entire deflector assembly 99. As disclosed, the means includes a cable 116 which is connected between a lever 118 and a tab 120 on the top wall 96 of the deflector assembly. Thus, the side walls 100 and rear wall 108 of the deflector assembly 96 can be pre-set at selected angles and the deflector assembly 96 can be tilted to an upper retracted position out of the discharge path of the material and lowered into an operative position to prevent spraying a following vehicle or pedestrians.

To conveniently support the spreader on the flat bed of a truck, a pallet carried by a fork lift truck or a railroad car or other vehicle, the spreader 10 includes a frame assembly 120 which includes front and rear bottom members 122 and 124 interconnected by side rails or side members 126. The frame 120 is connected to the hopper by upstanding, vertical posts 128 and 130. The front posts 128 and rear posts 130 are welded or otherwise secured to the hopper walls. As thus far described, the frame provides a stable support for resting the hopper on a vehicle bed. Alternatively, the frame can be connected to a trailer assembly 130 as presently described. The trailer assembly 130 includes wheels 132 supported between depending frame members 134 and 136. The trailer assembly 130 also includes a draw bar 138. The trailer 130 can be connected to the frame assembly 120 by clamps 140.

The hopper 12 can be calibrated with indicia 142 in pounds or other unit of measurement to enable the operator to determine discharge rate.

Although the material spreader has been described principally for use with salt for de-icing, the spreader is also adapted for use with a wide range of materials including seed, fertilizer, sand, weed killer, and calcium chloride. The metering gate 40 provides effective control of material particles of a substantial size range. The control of spreading afforded by the adjustable spinner blades, hopper gate 40 and the deflector assembly 99 enables distribution of material according to the manufacturers' specifications. The detachable hinged connections of the side plates 100 and rear and bottom plates 108, 109, permit removal for cleaning or operations not requiring deflector control. The compactness of the unit permits easy installation on a wide variety of vehicles. Extension cables can be connected to the controls so that the vehicle driver can control the spreading range of, for instance, 5 to 30 feet by manipulating the deflector assembly 99.

Various of the features of the invention are set forth in the following claims.

I claim:

1. A material spreader comprising a hopper having a rear, generally vertical hopper wall, a discharge outlet in said rear wall, a spinner shaft rotatably supported on said hopper, means for rotating said spinner shaft, a spinner plate fixed to said spinner shaft and located beneath said outlet, a spinner blade rotated by said shaft, a gate, means for supporting said gate on said hopper for vertical swinging movement in adjacent relation to said rear hopper wall and across said outlet to vary the material flow through said outlet, means for biasing said gate against said rear hopper wall comprising a fork having a pair of spaced fork legs, rollers on each of said legs engaging said gate, a fork arm pivotally connected intermediate its length to said hopper wall, and means on said arm spaced from said pivoted connection for engaging said hopper wall to pressure said rollers.

2. A material spreader comprising a hopper having a discharge outlet, a spinner shaft rotatably supported on said hopper, means for rotating said spinner shaft, a spinner plate fixed to said spinner shaft and located beneath said outlet, a spinner blade rotated by said shaft, a deflector assembly for adjustably deflecting lateral and rearward discharge, said deflector assembly including a top wall, side plates, and a rear plate, means for adjustably connecting said side plates and said rear plate to said deflector assembly top wall, said last named means comprising hinges connecting adjacent margins of said top wall, side walls and rear wall, upstanding tabs fixed to each of said side walls and said rear wall, upstanding apertured tabs on said top wall, links pivotally connected to said tabs on said side walls and said rear wall, slots in said links, and bolts extending through said slots and said apertures in said top wall tabs.

3. A material spreader in accordance with claim 2 including a spinner housing, a bottom deflector wall, means for pivotally connecting said bottom deflector wall to said spinner housing, and linking means connecting said bottom deflector wall to said rear deflector wall.

4. A material spreader in accordance with claim 2 including a spinner housing having a top wall and wherein said top deflector wall is pivotally connected to said top spinner housing wall, and means for remotely and adjustably swinging said top wall of said deflector assembly about said pivotal connection to vary the position of said deflector assembly with respect to said spinner blade.

5. A material spreader comprising a hopper having a discharge outlet, a spinner with throw-out blades, a spinner housing having a top wall located below said outlet and a deflector assembly, said deflector assembly including a top deflector plate, one of said top deflector plate and said spinner housing top wall having a hook and the other having an eye for hingedly and detachably connecting said top plate and said top wall, a pair of spaced deflector side plates, a rear deflector plate, a bottom deflector plate, and means for connecting said side and rear plates to said top plate and said bottom plate to said rear plate.

* * * * *